United States Patent
Sesha et al.

(10) Patent No.: US 12,088,610 B2
(45) Date of Patent: Sep. 10, 2024

(54) PLATFORM FOR PRIVACY PRESERVING DECENTRALIZED LEARNING AND NETWORK EVENT MONITORING

(71) Applicant: HEWLETT PACKARD ENTERPRISE DEVELOPMENT LP, Houston, TX (US)

(72) Inventors: Madhusoodhana Chari Sesha, Bangalore (IN); Krishna Prasad Lingadahalli Shastry, Bangalore (IN); Sathyanarayanan Manamohan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 497 days.

(21) Appl. No.: 17/512,609

(22) Filed: Oct. 27, 2021

(65) Prior Publication Data

US 2023/0130705 A1   Apr. 27, 2023

(51) Int. Cl.
*H04L 9/40*   (2022.01)

(52) U.S. Cl.
CPC ........ *H04L 63/1425* (2013.01); *H04L 63/145* (2013.01); *H04L 63/1466* (2013.01); *H04L 63/1483* (2013.01)

(58) Field of Classification Search
None
See application file for complete search history.

(56) References Cited

U.S. PATENT DOCUMENTS

| | | | | |
|---|---|---|---|---|
| 8,339,959 | B1* | 12/2012 | Moisand | H04L 45/60 370/235 |
| 8,418,249 | B1* | 4/2013 | Nucci | G06F 21/552 709/225 |
| 8,682,812 | B1* | 3/2014 | Ranjan | H04L 43/028 706/12 |
| 9,083,740 | B1* | 7/2015 | Ma | H04L 63/145 |
| 11,223,562 | B1* | 1/2022 | Guo | H04L 69/166 |
| 2008/0263661 | A1* | 10/2008 | Bouzida | H04L 63/1416 726/22 |
| 2011/0138463 | A1* | 6/2011 | Kim | H04L 63/1458 726/22 |

(Continued)

*Primary Examiner* — Khang Do
(74) *Attorney, Agent, or Firm* — Sheppard Mullin Richter & Hampton LLP

(57) ABSTRACT

Systems and methods are provided for implementing pattern detection as a first step for security improvements of a computer network. The pattern detection may utilize a machine learning (ML) model for predicting network tuple parameters. The ML model can be trained on labelled data flow information and deployed by a central server for preventing network-wide cyber-security challenges (e.g., including DNS flux, etc.). Networking devices (e.g. switches, etc.) can monitor the data flow traffic that it receives from the networking devices and classify network tuple parameters based on the flow behavior. The system can compare the output of the ML model (e.g., a classification of the data flow traffic, etc.) to an implicit label (e.g., the network tuple parameter included with the data flow traffic, etc.). When the classification matches a particular network tuple parameter, the system can generate an alert and/or otherwise identify potential network intrusions and other abnormalities.

20 Claims, 8 Drawing Sheets

(56) References Cited

U.S. PATENT DOCUMENTS

| | | | | |
|---|---|---|---|---|
| 2013/0041934 A1* | 2/2013 | Annamalaisami | ...... | H04N 45/38 709/203 |
| 2013/0064104 A1* | 3/2013 | Bekiares | ............ | H04L 63/1466 370/252 |
| 2013/0160122 A1* | 6/2013 | Choi | ................... | H04L 63/1416 726/23 |
| 2014/0136680 A1* | 5/2014 | Joshi | .................... | H04L 43/026 709/224 |
| 2015/0341379 A1* | 11/2015 | Lefebvre | ............ | H04L 43/0894 726/22 |
| 2017/0279838 A1* | 9/2017 | Dasgupta | ............ | H04L 63/1425 |
| 2018/0103056 A1* | 4/2018 | Kohout | .............. | H04L 41/0686 |
| 2018/0287907 A1* | 10/2018 | Kulshreshtha | .......... | H04L 43/04 |
| 2019/0036780 A1* | 1/2019 | Evans | ................... | H04L 41/145 |
| 2020/0076853 A1* | 3/2020 | Pandian | ............. | H04L 61/4511 |
| 2021/0029083 A1* | 1/2021 | Li | ........................ | H04L 63/145 |
| 2021/0385241 A1* | 12/2021 | Hayashi | ................. | H04L 63/20 |
| 2021/0392171 A1* | 12/2021 | Srinivas | ................. | G06N 5/047 |
| 2022/0407841 A1* | 12/2022 | Karpowicz | ......... | H04L 63/0263 |
| 2023/0092777 A1* | 3/2023 | Nainar | ................... | G06N 3/084 726/23 |
| 2023/0283621 A1* | 9/2023 | Techentin | ............ | H04L 63/145 726/23 |

* cited by examiner

PLATFORM FOR PRIVACY PRESERVING DECENTRALIZED LEARNING AND NETWORK EVENT MONITORING

BACKGROUND

Cyber security risks are ever prevalent. One type of security risk involves a domain name system (DNS) technique used by botnets (e.g., a network of private computers infected with malicious software and controlled as a group without the owners' knowledge) to hide phishing and malware delivery sites. The sites are hidden using the botnets, which can continuously change the host computers acting as proxies for the malicious software. Another type of security risk is called "DNS flux," which is a combination of peer-to-peer networking, distributed command and control, web-based load balancing, and proxy redirection used to make malware networks more resistant to discovery and counter-measures.

In these risk examples, the malicious application can have numerous internet protocol (IP) addresses associated with a single fully-qualified domain name, where the IP addresses are swapped in and out at an extremely high frequency (e.g., through changing DNS records). As such, even standard computer networks that attempt to thwart the malicious activity can be compromised.

BRIEF DESCRIPTION OF THE DRAWINGS

The present disclosure, in accordance with one or more various examples, is described in detail with reference to the following figures. The figures are provided for purposes of illustration only and merely depict typical examples.

Figure 1:
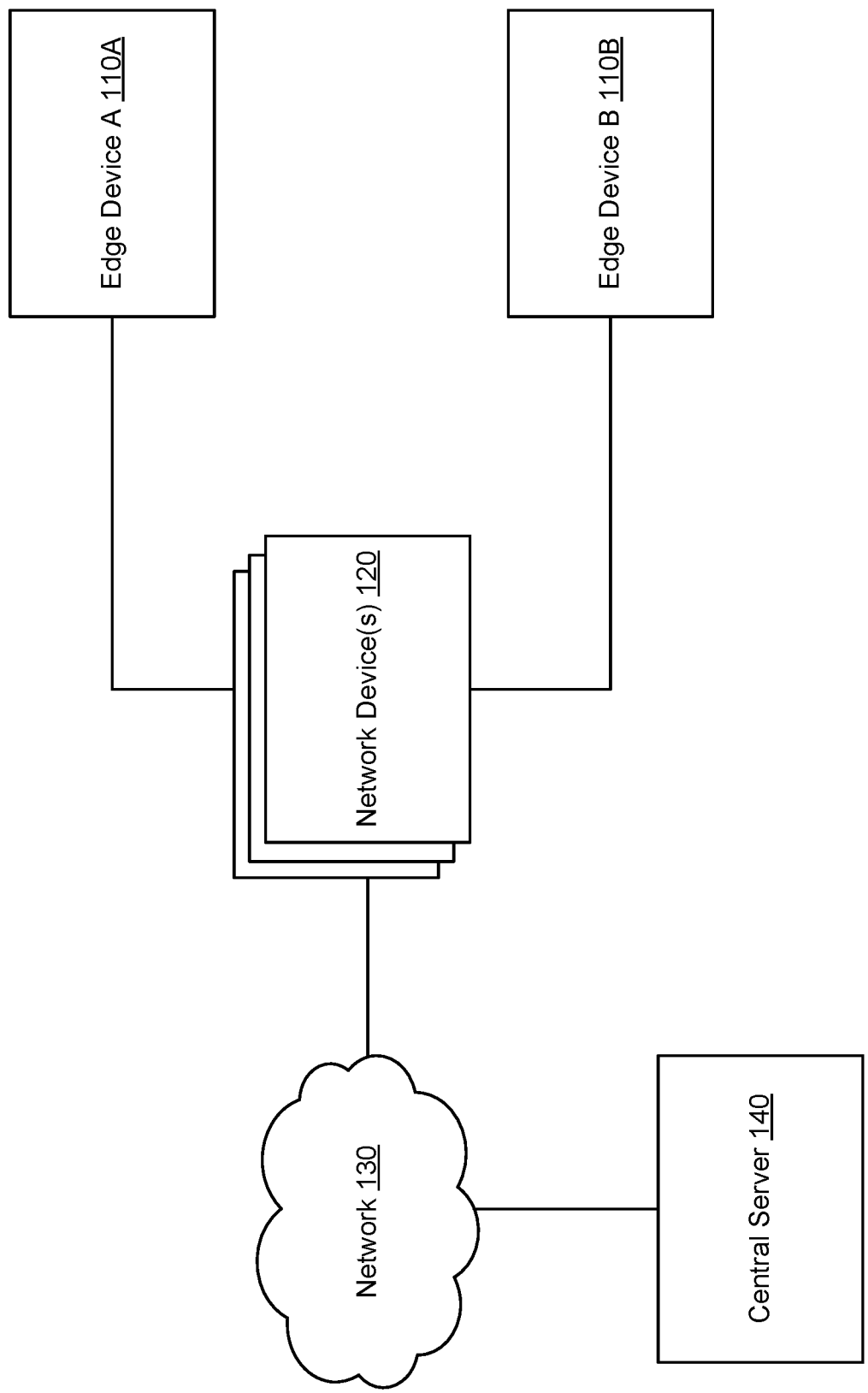
FIG. 1 illustrates a computer environment in accordance with one or more examples of the disclosure.

The figures are not exhaustive and do not limit the present disclosure to the precise form disclosed.

DETAILED DESCRIPTION

One method of attempting to thwart the cyber security risks posed to DNS technology is by encrypting transmitted data packets. However, this implementation can backfire. Several networks have implemented encryption algorithms to transmit encrypted data flow traffic, which contributes to the wide breadth of secret data being transmitted constantly. Encrypted data traffic flow cannot be checked easily for malicious content. When the data cannot be reviewed and checked for malicious contents, the cyber security risks can enter the system undetected and increase the risk of cyber security issues.

Additionally, network parameters of computer devices can be removed or randomized to help hide its identity to other devices in a network. For example, network identification of a client device via well-known network parameters can be randomized, which allows fewer processes to identify senders of data, in addition to hiding the data contents. While removing or randomizing network parameters of these devices may help protect the privacy of the sending device, it also increases the security risks of the network by not being able to identify the users of the network. Thus, the decreased ability to identify data (e.g., via encryption) and origins of the data (e.g., via DNS masking and hiding malware networks) can make it more difficult to detect malware and bad actors.

Examples of the application describe a platform for implementing pattern detection as a first step for security improvements at the network edge device. The pattern detection may be a continuous and finer variation on other systems that may similarly detect patterns in data and senders.

For example, the platform may include a machine learning (ML) model for predicting a classified label based on information associated with the data flow. The ML model can be trained on labelled data flow traffic information. The trained ML model may be deployed in a decentralized manner at one or more network devices or in a centralized manner at a central server. Either implementation can prevent network-wide cyber-security challenges (e.g., including DNS flux).

Networking devices (e.g. switches or other network devices) can monitor the data flow traffic to determine one or more flow behaviors, including inter-packet arrival time (e.g., minimum, mean, maximum, standard deviation) or packet length (e.g. minimum, mean, maximum, etc.) for a particular data flow. The ML model can receive the data flow traffic from the networking devices and classify the network tuple parameters based on a data flow behavior. The platform can compare the output of the ML model (e.g., classification of the data flow traffic) to an identifier or implicit label (e.g., the network tuple parameter included with the data flow traffic). When the classification matches a particular network tuple parameter, the platform can generate an alert and/or otherwise identify potential network intrusions, domain name system (DNS) issues, and other abnormalities.

Technical improvements are realized throughout the disclosure. For example, implementation can improve network security by incorporating decentralized network behavior learning. Additionally, centralized data and machine learning may reduce errors and normalize various data types to create a more streamlined processing and data analytics system.

Before describing examples of the disclosed systems and methods in detail, it is useful to describe an example network installation with which these systems and methods might be implemented in various applications. FIG. 1 illustrates a computer environment in accordance with one or more examples of the disclosure. The computer environment can include one or more edge devices 110 (illustrated as first edge device 110A and second edge device 110B), network device 120, external network 130 (e.g., Internet), and central server 140.

Edge devices 110 may comprise one or more computing components that transmit data packets to other computing components within the same network or in other networks. Each edge device 110 may comprise a hardware processor (e.g., central processing units (CPUs), semiconductor-based microprocessors) for retrieval and execution of instructions stored in machine readable storage medium. The hardware processor may fetch, decode, and execute instructions to control processes or operations for transmitting data packets.

Edge devices 110 can include one or more client devices (e.g., desktop computers, laptop computers, servers, or other network devices) in communication with a controller to enable communication between edge devices 110, network devices 120, and central server 140. Edge devices 110 may include multiple controllers and/or multiple communication points. In some examples, the controller may communicate with other devices through network device 120 that is compliant with IEEE 802.11 standard in order to access network 130. The controller may be operable to configure and/or manage network devices 120.

Network devices 120 provide network connectivity (e.g., to network 130) to various edge devices 110. Network devices 120 may include, for example, switches, routers, access points, gateways, or other devices. Using a connection to network devices 120, edge devices 110 may access network resources available on network 130. Network devices 120 may be a combination of hardware, software, and/or firmware that is configured to provide wireless network connectivity to wireless client devices from each network. Network devices 120 can be managed and configured by the controller. Additional detail of network device 120 is provided with FIG. 2.

Figure 2:
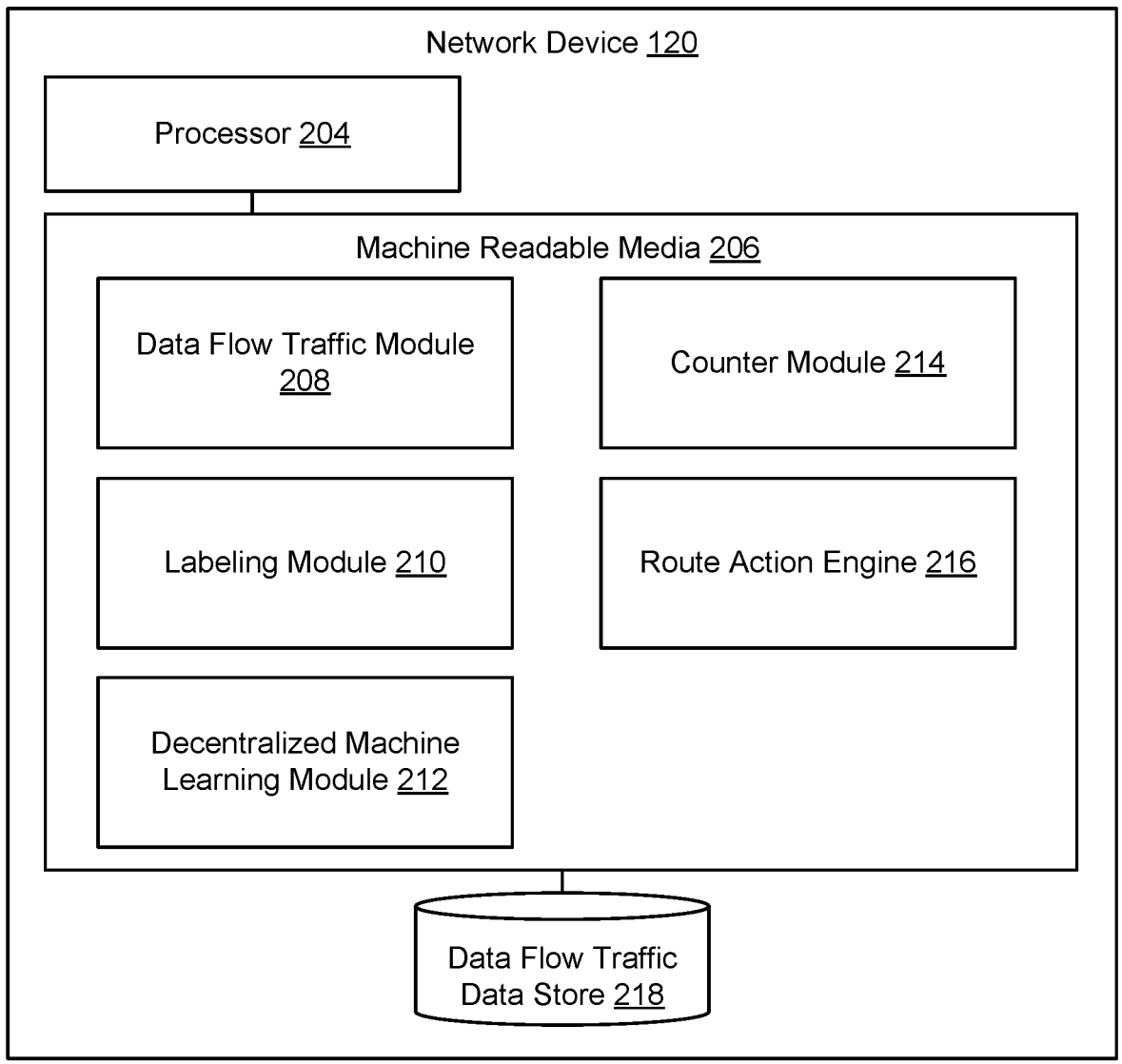
FIG. 2 illustrates a network device in the computer environment in accordance with one or more examples of the disclosure.

An illustrative network device 120 is provided in FIG. 2. For example, each network device 120 may comprise its own processor 204, machine readable media 206, and data flow traffic data store 218. Machine readable media 206 may comprise one or more modules and engines, including data flow traffic module 208, labeling module 210, decentralized machine learning module 212, counter module 214, and route action engine 216.

Processor 204 may be one or more central processing units (CPUs), semiconductor-based microprocessors, and/or other hardware devices suitable for retrieval and execution of instructions stored in machine readable storage medium 206. Processor 204 may fetch, decode, and execute instructions to control processes or operations for implementing routing table anomaly detection using unsupervised machine learning. As an alternative or in addition to retrieving and executing instructions, processor 204 may include one or more electronic circuits that include electronic components for performing the functionality of one or more instructions, such as a field programmable gate array (FPGA), application specific integrated circuit (ASIC), or other electronic circuits.

Machine readable media 206 may be any electronic, magnetic, optical, or other physical storage device that contains or stores executable instructions. Machine readable media 206 may be, for example, Random Access Memory (RAM), non-volatile RAM (NVRAM), an Electrically Erasable Programmable Read-Only Memory (EEPROM), a storage device, an optical disc, and the like. In some examples, machine readable media 206 may be a non-transitory storage medium, where the term "non-transitory" does not encompass transitory propagating signals.

Data flow traffic module 208 is configured to monitor a set of flow behaviors for data flow traffic. For example, when data packets are transmitted from first edge device 110A to a destination device, the data stream may be received at network device 120. The flow behaviors can comprise, for example, inter-packet arrival time (e.g., minimum, mean, maximum, or standard deviation) or packet length (e.g. minimum, mean, or maximum) for a particular traffic flow.

Monitoring the data flow traffic can comprise receiving and analyzing one or more streams of data as data flow traffic from one or more edge devices 110 (e.g., a plurality of data packets transmitted from a source computer as a stream of data, etc.) received at network device 120. Once the data stream is received, data flow traffic module 208 can apply a classified label to a portion of the data flow traffic.

The classified label may be determined using various methods. For example, the classified label may be determined based on information from the data flow (e.g., identifier, implicit label, signature, network tuple, behaviors, etc.). The information from the data flow may be provided as input to a machine learning model. The output of the machine learning model may be the classified label. In some examples, the classified label is determined by providing the one or more streams of data as data flow traffic from one or more edge devices 110 to a machine learning model at network device 120 (e.g., using decentralized machine learning module 212).

Data flow traffic module 208 is also configured to receive a set of flow behaviors for data flow traffic. For example, edge device 110 may implement a process to receive sensor data and analyze the sensor data for behaviors and properties locally at edge device 110. The sensor data may be used as the data flow traffic. In some examples, each edge device 110 may apply an implicit label or identifier to the data flow traffic prior to sending the data flow traffic to network device 120 (e.g., based on header data from the sensor).

Labeling module 210 is configured to determine an implicit label for the network tuple parameter for the particular data flow. The network tuple parameter may comprise, for example, QOS (e.g. media type), VLAN, MAC address (e.g., source or destination MAC address), or other values from the packet header. In some examples, the implicit label can comprise a reported value for the network tuple parameter (e.g., an identifier that the data packet carries as reported in the packet header). Examples of the implicit label associated with the network tuple parameter may include, for example, a Differentiated Services Code Point (DSCP) code corresponding with a quality of service (QOS) value. The DSCP code may use a 6-bit Differentiated Services (DS) field in the IP header for the purpose of packet classification.

The data with the data flow traffic may comprise one or more labelled network tuples. The labeled network tuples may include, for example, quality of service (QOS) (e.g., media type), virtual local area network (VLAN), media access control (MAC) address (e.g., source or destination), source IP address, destination IP address, source/destination port number, transmission control protocol/internet protocol (TCP/IP) value, and other network tuples.

The data with the data flow traffic may comprise a digital signature. The digital signature may correspond with a mathematical algorithm to create a digital fingerprint identifying a source device or application and validate that the data originates from that source.

The labelled network tuples and/or signatures can authenticate flow behaviors to the monitored set of flow behaviors. The application of the labelled network tuples and/or signatures can help predict a classification for a network tuple parameter for a particular data flow.

Decentralized machine learning module 212 is configured to apply a machine learning (ML) model (e.g., supervised learning) to the identifier, implicit label, network tuple, or set of flow behaviors for data flow traffic. These values may be input to a trained ML model that generates an output as a particular classification or classified label.

The ML model may be trained using role-based segmentation, like a Virtual Local Area Network (VLAN). Typical behaviors may exist within each role, as illustrated in Table 1, and each behavior corresponding with each VLAN may be provided as input to train the ML model. Once the model is trained, new behaviors may be provided as input to the trained ML model and the classified label may be output.

The classified label may comprise various values. In the example shown in Table 1, the classified label may one or more network tuple parameters corresponding with a particular VLAN in the network.

TABLE 1

| Data | Classified Label |
|---|---|
| Behaviors | Vlan 1 [Network Tuple Parameter] |
| Behaviors | Vlan 2 [Network Tuple Parameter] |

The ML model may also be trained on behavior data, as illustrated in Table 2. The behavior data may be provided as input to the trained ML model and a VLAN may be identified as output from the trained ML model. The data flow traffic may be identified with an determined label corresponding with network tuple parameter. Each flow may be compared with a network tuple parameter and if it matches, the match counter value may be incremented. If not, the mismatch counter value may be incremented.

TABLE 2

| Data | Predict Label | Compare |
|---|---|---|
| Behaviors | _[Network Tuple Parameter] | |
| Behaviors | _[Network Tuple Parameter] | |

Decentralized machine learning module 212 is also configured to generate, train, and implement multiple machine learning (ML) models. Each ML model may correspond with a model identifier (ID) that may be associated with a request to apply data as input to the particular trained ML model.

Decentralized machine learning module 212 is also configured to receive the model ID corresponding to a particular ML model in a set of ML models from central server 140. The set of ML models may be private (e.g., accessible by central server 140 or network device 120). Each ML model may comprise sets of public model IDs, labeled network tuples, and private flow signatures. In some examples, the model IDs and not the ML model, may be transmitted between central server 140 and network device 120.

Decentralized machine learning module 212 is configured to compare the received model ID with a stored model IDs that corresponds with one or more stored ML models. When the model ID matches the model ID corresponding with a stored ML model, decentralized machine learning module 212 may apply the monitored set of flow behaviors to the stored ML model to predict a classification for the network tuple parameter for the particular data flow (e.g., the classified label). In some examples, the stored ML model is a random model from the private set of ML models (e.g., not corresponding with the model ID). This may help further maintain privacy by obfuscating the ML model that is selected.

In some examples, the comparison between the received model ID and the stored model IDs results in a mismatch, and various actions may be initiated. In some examples, decentralized machine learning module 212 (with route action engine 216) may generate and transmit an alert to central server 140 identifying the received model ID (e.g., without a signature or without the pattern of flow behavior). By sending the alert to central server 140 without the signature, privacy is increased and risk is decreased by, at least, keeping the signature at network device 120, based on the inability of central server 140 to identify an accurate stored model ID.

In some examples, in the event of a mismatch, the received model ID, pattern of flow behavior, and signature may be stored locally at network device 120 (e.g., absent transmitting information back to central server 140). By storing information locally, privacy may be increased and risk is decreased by, at least, keeping the signature at network device 120, based on the inability of central server 140 to identify an accurate stored model ID.

Decentralized machine learning module 212 is also configured to update one or more ML models. For example, a classification for the network tuple parameter may be generated as output from a first ML model. The classification and previous input provided to the ML model may again be provided as input to a second ML model. This may help implement decentralized learning capability when a first ML model is implemented at network device 120 and the second ML model is implemented at central server 140.

Labeling module 210 is also configured to compare the classified label to the implicit label (e.g., in a packet header of the data flow traffic). In some examples, labeling module 210 may determine whether the classified label or the implicit label is greater than the other one. In other examples, labeling module 210 may compare each label to a threshold value to determine if one or more of these labels matches the threshold value.

As an illustrative example, the implicit label may correspond with a QOS value (e.g., added to each data packet by an application at edge device 110 and dictate an amount of bandwidth or other system resources that can be used to transmit the data packets along the data flow). However, there are instances where the flow behavior do not match the properties which the QOS value represents (e.g., mismatched). This can happen because of multiple reasons, like an inherent bug in the application browser, a change by the user itself, a network delay, a backdoor firmware update, or even rogue data packets being sent with the expected data flow. The flow behavior may correlate to a classified label determined by the ML model to objectively measure the data flow traffic as the system receives and transmits it.

Counter module 214 may be configured to increment or decrement various counter values (e.g., a mismatch counter value or a match counter value). For example, when the comparison (e.g., between the classified label and the implicit label, etc.) results in a mismatch, a counter may be incremented for the data flow traffic by counter module 214. The greater the counter value, the greater the inconsistency with which the actual flow behavior matches the expected flow behavior. The counter may help identify the consistency (or inconsistency) with which the expected flow behavior (e.g., illustrated as the implicit label in the packet header) is performing to the expected level.

Counter module 214 may be configured to compare the counter value with a threshold value. When the counter exceeds a threshold value, the data flow traffic may be consistently failing to meet expected flow behaviors.

In some examples, when the comparison results in a mismatch (e.g., between the classified label and the implicit label), the values for the flow behaviors in the implicit label may be stored locally (e.g., at data flow traffic data store 218).

In some examples, when the comparison results in a mismatch (e.g., between the classified label in the implicit label), the values for the flow behaviors in the implicit label may not be transmitted to central server 140 and may be stored locally (e.g., at data flow traffic data store 218) instead. In some examples, storing the values for the flow behaviors locally at network device 120 may be absent transmitting the values to central server 140. This restriction on transmitting data to central server 140 may help allow for privacy/obfuscation and reduced risk of cyber security issues by reducing the amount of data that is transmitted via network 130.

Route action module 216 may be configured to perform various actions based on the data, labels, and behaviors of the data flow. For example, an action of route action module 216 may include generating an alert associated with the comparison between the classified label for the network tuple parameter to the implicit label. The alert may include the flow behaviors, a suspicious activity identifier for the data flow traffic, or identifiers of the source or destination of the suspicious data flow. The alert may be stored locally (e.g., at data flow traffic data store 218), may be transmitted to central server 140, or may be transmitted to an administrative user operating a client device accessing network 130.

When the counter is above a threshold value, the alert may be updated to include a suspicious activity identifier for the data flow traffic. Other information may be included in the alert as well. For example, the alert may include a ML model identifier, the labels data, or other information included with the data flow traffic. The alert may be transmitted to central server 140 (e.g., via route action engine 216) or an administrative user operating a client device accessing network 130.

In some examples, the alert may identify a new behavior and/or include a model identifier, label data, or other information included with the data flow traffic. In this instance, the alert can be updated to identify a domain name system (DNS) issue like DNS flux or when botnets (e.g., a network of private computers infected with malicious software and controlled as a group without the owners' knowledge) hide phishing and malware delivery sites on a host computer (e.g., network devices 120) acting as proxies for the malicious software. This or other information may be incorporated with the ML model (e.g., via machine learning model 214) to provide additional information about the new behavior.

Route action module 216 may be configured to initiate an automated response in the communication network. For example, one or more network ports can be re-authenticated or data packets may be re-routed (e.g., in accordance with centralized rules).

Route action module 216 may be configured to trigger a movement of the corresponding workload (e.g., implemented on a virtual machine (VM), or changing from a first VM to a second VM). For example, the workload may scale to work with any computing environment. For example, the association between a Model ID and Parameters can be copied from a first computing environment to a second computing environment. The association between Model ID and Parameters can be used to reintegrate the environment into the second computing environment's on-premise or enterprise secure monitoring (e.g., via Representational state transfer (REST) or other integration scheme).

In some examples, the action is determined by central server 140 and transmitted to network device 120 to implement by route action module 216. Route action module 216 may receive the action and implement it at network device 120. In this instance, the action determined by central server 140 may instruct a plurality of network devices 120 to perform similar actions in parallel or sequentially across the plurality of network devices 120.

Returning to FIG. 1, network 130 may be a public or private network, such as the Internet, or other communication network to allow connectivity among the various devices. Network 130 may include third-party telecommunication lines, such as phone lines, broadcast coaxial cable, fiber optic cables, satellite communications, cellular communications, and the like. Network 130 may include any number of intermediate network devices, such as switches, routers, gateways, servers, and/or controllers, which are not directly part of the network configuration but that facilitate communication between the various parts of the network configuration, and between the network configuration and other network-connected entities.

Central server 140 may provide backup and consistency at a central location across a decentralized network of network devices 120. Central server 140 may be in communication with network devices 120 via network 130. Central server 140 may be a combination of hardware, software, and/or firmware that is configured to store instructions and provide consolidated actions across a plurality of network devices 120. Additional detail of central server 140 is provided with FIG. 3.

Figure 3:
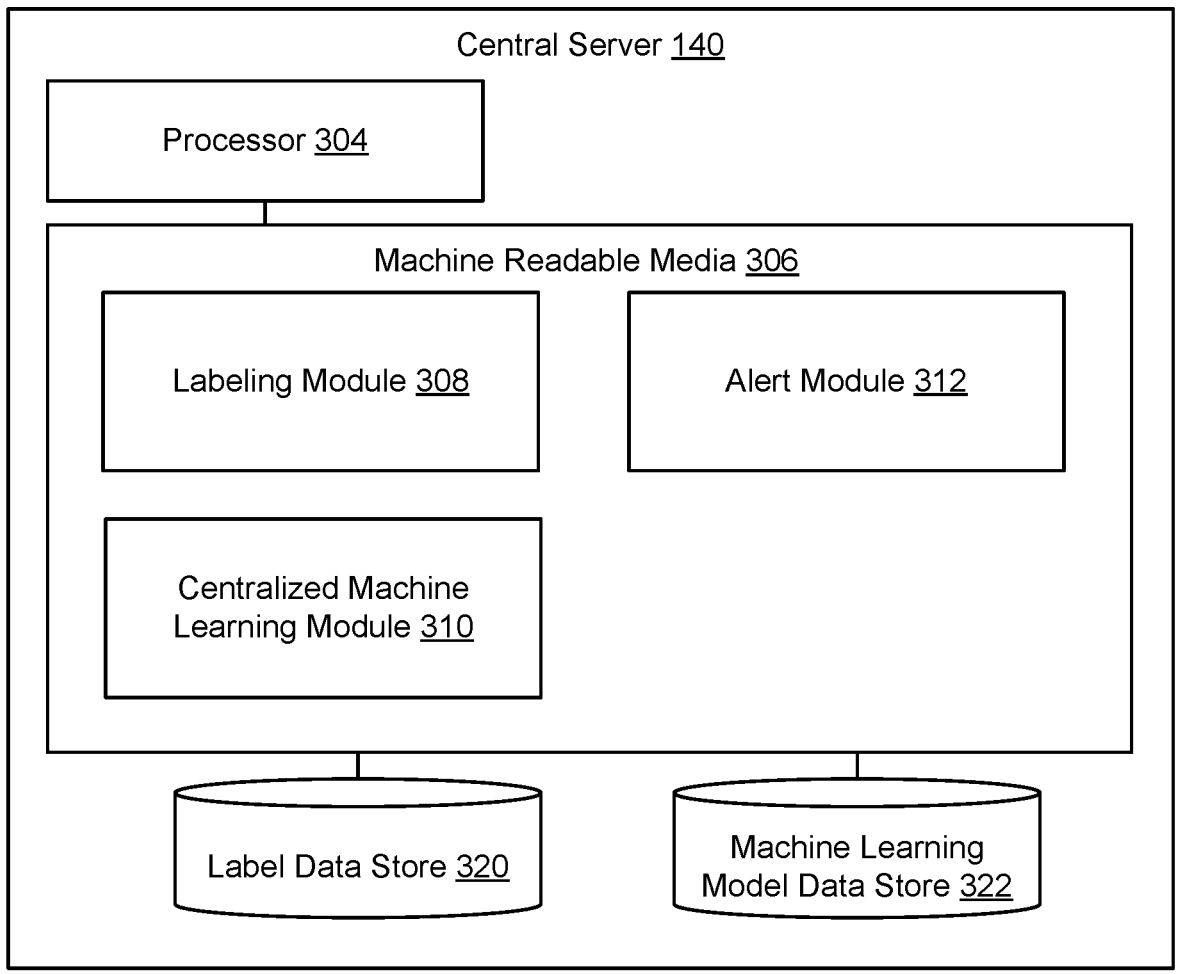
FIG. 3 illustrates a central server in the computer environment in accordance with one or more examples of the disclosure.

FIG. 3 illustrates a central server in the computer environment in accordance with one or more examples of the disclosure. For example, central server 140 comprises one or more hardware processors 304, machine readable media 306, label data store 320, and machine learning model data store 322. Machine readable media 306 may comprise one or more modules and engines, including labeling module 308, centralized machine learning module 310, and alert module 312.

Processor 304 may be one or more central processing units (CPUs), semiconductor-based microprocessors, and/or other hardware devices suitable for retrieval and execution of instructions stored in machine readable storage medium 306. Processor 304 may fetch, decode, and execute instructions to control processes or operations for implementing routing table anomaly detection using unsupervised machine learning. As an alternative or in addition to retrieving and executing instructions, processor 304 may include one or more electronic circuits that include electronic components for performing the functionality of one or more instructions, such as a field programmable gate array (FPGA), application specific integrated circuit (ASIC), or other electronic circuits.

Machine readable media 306 may be any electronic, magnetic, optical, or other physical storage device that contains or stores executable instructions. Machine readable media 306 may be, for example, Random Access Memory (RAM), non-volatile RAM (NVRAM), an Electrically Erasable Programmable Read-Only Memory (EEPROM), a storage device, an optical disc, and the like. In some examples, machine readable media 306 may be a non-transitory storage medium, where the term "non-transitory" does not encompass transitory propagating signals.

Labeling module 308 is configured to receive a classified label based on information associated with the data flow (e.g., identifier, implicit label, signature, network tuple, behaviors, etc.). The received labels may be stored at label data store 320. The implicit label may be based on information contained in data flow traffic and the classified label may be generated by network device 120 using one or more processes described herein, including being generated by a decentralized ML model.

Labeling module 308 is also configured to integrate labels from one network device 120 with other network devices. For example, central server 140 may be a central repository for integrating any newly learned signals with other network devices in a computing environment. Central server 140 may be extended to integrate the newly learned labels, behaviors, or signals, including a policy, re-authentication process, re-validation process, or an action to perform by other network devices in response to the learned signals in other computing environments.

Centralized machine learning module 310 is configured to generate a set of private ML models that are local to central server 140 and stored at machine learning model data store 322. The private set of ML models may be based on one or more generated ML models from network devices 120. The private set of ML models may be improved at the central server 140 using the distributed and decentralized ML models at network devices 120 (e.g., by expanding the training data set and/or by including additional classifications from network devices 120). In some examples, the private set of ML models may comprise a set of model identifiers (IDs), labeled network tuples, and one or more signatures for flow behaviors. The signatures for flow behaviors and other data may be private to central server 140 to help increase data security and limit the data that is transmitted via network 130.

The ML model may classify the labelled network tuples, identifier or implicit label, signatures, and/or flow behaviors and generate a new classified label. The new classified label may be stored with label data store 320. In other examples, the classified label is received from network device 120.

Centralized machine learning module 310 is also configured to correlate a machine learning model stored locally with machine learning model data store 322 and a machine learning model received from network device 120. Each ML model may correspond with a model ID associated with the classified label. In some examples, centralized machine learning module 310 may determine the model ID from a set of model IDs that correspond with the classified label (e.g., generated by network device 120) and provide the model ID to network device 120 (e.g., using alert module 312).

Centralized machine learning module 310 may also be configured to update the private set of ML models based on the classified label for the network tuple parameter. For example, centralized machine learning module 310 may determine the model ID corresponding with the classified label (e.g., as stored in machine learning model data store 322) by comparing the received classified label with stored classified label. The model ID may be returned when a match between the received classified label matches the stored classified label.

Alert module 312 may be configured to generate and transmit the alert based on the classified label. For example, alert module 312 can compare the classified label from network device 120 to the network tuple parameter included with the data flow traffic. When the classification between the classified label and a particular network tuple parameter matches, alert module 312 can generate an alert and/or otherwise identify potential network intrusions, domain name system (DNS) issues, and other abnormalities. The alert may be transmitted to an administrative user (or other alert functions performed by route action module 216 of network device 120).

Alert module 312 is also configured to monitor frequency of events that occur in the distributed environment, including at each of the plurality of network devices 120 or edge devices 110. Alert module 312 may generate a log or update a data store to identify the potential network intrusions, domain name system (DNS) issues, and other abnormalities that occur and timestamps or frequency associated with each event.

In some examples, alert module 312 determines an action to be performed by a plurality of network devices 120. The action may include instructing each of the network devices to re-authenticate one or more network ports or re-route data packets (e.g., in accordance with centralized rules). The action may be transmitted to network device 120. In these examples, the action determined by alert module 312 may instruct a plurality of network devices 120 to perform similar actions. The actions may be performed in parallel or sequentially across the plurality of network devices 120.

Figure 4:
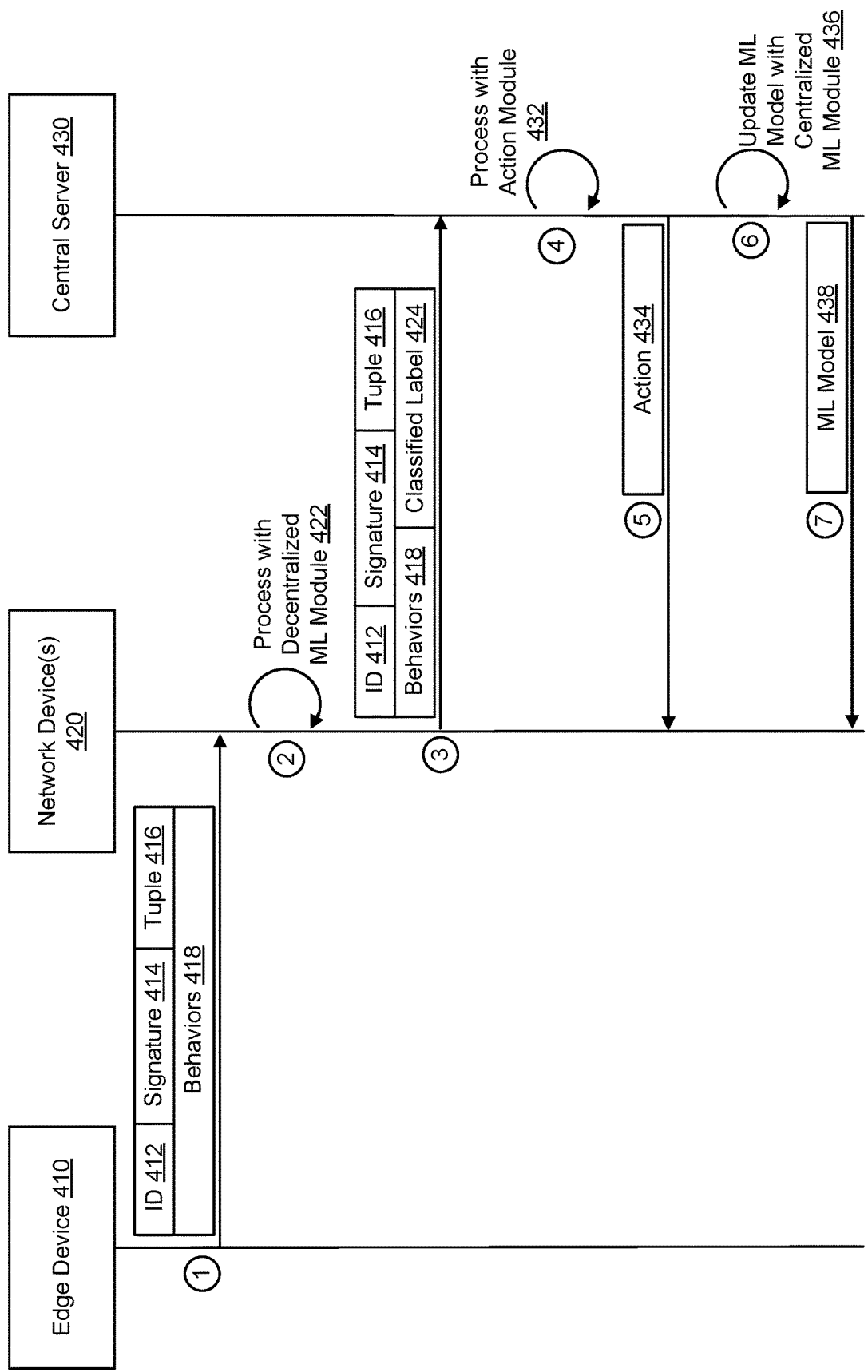
FIG. 4 illustrates a data flow in accordance with one or more examples of the disclosure.

FIG. 4 provides an illustrative data flow process in accordance with examples in the disclosure. The illustrative process should be construed as open ended as opposed to limiting the disclosure. For example, the classified label may be generated by network device 120, at least in part by, applying a machine learning (ML) model that comprises labelled network tuples, an identifier or implicit label, and/or signatures for flow behaviors to the newly monitored flow behaviors. Network device 120 may also detect flow behaviors associated with the transmission of one or more data packets in the data flow.

In FIG. 4, edge device 410, network device 420, and central server 430 are provided. In this example, edge device 410, network device 420, and central server 430 illustrated in FIG. 4 may correspond with embodiments of edge device 110, network device 120, and central server 140 illustrated in FIG. 1, respectively.

At block 1, edge device 410 may generate data flow traffic. The data flow traffic may comprise, for example, an identifier 412 or implicit label, signature 414, network tuple parameter 416, and one or more behaviors 418 of the data flow traffic. Edge device 410 may transmit the data flow traffic to network device 420. The data flow traffic may be transmitted as a data packet with a data packet header containing information associated with the data flow traffic as well.

Identifier 412 or implicit label may comprise, for example, a reported value for the network tuple parameter (e.g., an identifier that the data packet carries as reported in the packet header). Examples of the implicit label associated with the network tuple parameter may include, for example, a Differentiated Services Code Point (DSCP) code corresponding with a quality of service (QOS) value. The DSCP code may use a 6-bit Differentiated Services (DS) field in the IP header for the purpose of packet classification.

Signature 414 may comprise, for example, a digital fingerprint identifying a source device or application used to validate that the data originates from that source.

Network tuple parameter 416 may comprise, for example, quality of service (QOS) (e.g., media type), virtual local area network (VLAN), media access control (MAC) address (e.g., source or destination), source IP address, destination IP address, source/destination port number, transmission control protocol/internet protocol (TCP/IP) value, and other network tuples.

Behaviors 418 may comprise, for example, inter-packet arrival time (e.g., minimum, mean, maximum, or standard deviation) or packet length (e.g. minimum, mean, or maximum) for a particular traffic flow.

At block 2, network device 420 may process the data flow traffic with a ML model implemented by decentralized machine learning module 422. The output from the ML model may generate classified label 424.

At block 3, the data flow traffic (e.g., identifier 412 or implicit label, signature 414, network tuple parameter 416, behaviors 418) may be transmitted to central server 430 with classified label 424.

At block 4, central server 430 may process the received data with action module 432 to determine one or more actions 434. The one or more actions 434 may be intended to be performed by one or more network devices 420.

At block 5, action 434 may be transmitted to network device 420. network device 420 may be configured to implement the action (e.g., re-routing traffic, sending an alert to an administrative user, re-authenticating network ports).

At block 6, central server 430 may update one or more private ML models using centralized ML module 436.

At block 7, central server 430 may transmit information associated with the centralized (or private) ML models to the one or more network devices 420. The one or more network devices 420 may update their local ML models using the information received from central server 430.

Figure 5:
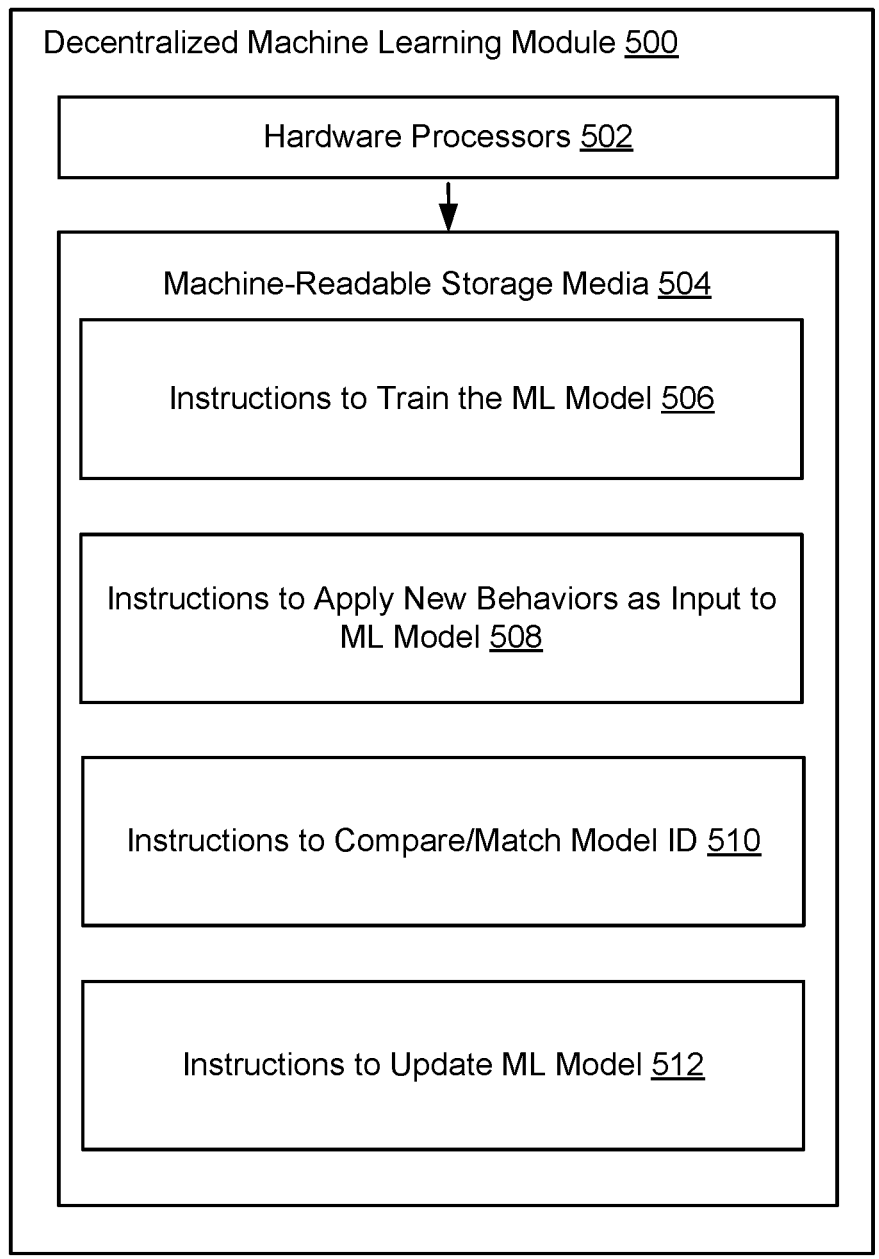
FIG. 5 is an example decentralized machine learning module that may be used to implement various features of examples described in the present disclosure.

FIG. 5 illustrates an example machine learning module in accordance with various examples. In the example implementation of FIG. 5, the computing component 500 includes a hardware processor 502 and machine readable storage medium for 504.

Hardware processor 502 may be one or more central processing units (CPUs), semiconductor-based microprocessors, and/or other hardware devices suitable for retrieval and execution of instructions stored in machine readable storage medium 504. Hardware processor 502 may fetch, decode, and execute instructions, such as instructions 506-512, to control processes or operations. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine readable storage medium, such as machine readable storage medium 604, may be any electronic, magnetic, optical, or other physical storage device that contains or stores executable instructions. Thus, machine readable storage medium 604 may be, for example, Random Access Memory (RAM), non-volatile RAM (NVRAM), an Electrically Erasable Programmable Read-Only Memory (EEPROM), a storage device, an optical disc, and the like. In some examples, machine readable storage medium 504 may be a non-transitory storage medium, where the term "non-transitory" does not encompass transitory propagating signals. As described in detail below, machine readable storage medium 5604 may be encoded with executable instructions, for example, instructions 506-512.

Hardware processor 502 may execute instruction 506 to train the ML model. In some examples, the ML model may be trained using role-based segmentation, like a Virtual Local Area Network (VLAN), such that typical behaviors may exist within each role. In some examples, the ML model can be trained on labelled data flow traffic information.

Hardware processor 502 may execute instruction 508 to apply the new behaviors as input to the trained ML model. For example, the new behavior may be received from data flow traffic and provided to the trained ML model. The ML model may determine the classified label as output to classify the new behaviors.

Hardware processor 502 may execute instruction 510 to compare or match the model identifier with a stored model identifier. For example, when the received model ID matches the model ID corresponding with a stored ML model, the processor may apply the monitored set of flow behaviors to the particular ML model matching the model ID. The output of the particular ML model may predict a classification for the network tuple parameter for the particular data flow (e.g., the classified label). In some examples, the stored ML model is a random model from the private set of ML models (e.g., not corresponding with the model ID). This may help further maintain privacy by obfuscating the ML model that is selected.

In some examples, the comparison between the received model ID and the stored model IDs results in a mismatch, and various actions may be initiated. The processor may generate and transmit an alert to central server 140 identifying the received model ID (e.g., without a signature or without the pattern of flow behavior). By sending the alert to central server 140 without the signature, privacy is increased and risk is decreased by, at least, keeping the signature at network device 120, based on the inability of central server 140 to identify an accurate stored model ID.

In some examples, in the event of a mismatch, the received model ID, pattern of flow behavior, and signature may be stored locally at network device 120 (e.g., absent transmitting information back to central server 140). By storing information locally, privacy may be increased and risk is decreased by, at least, keeping the signature at network device 120, based on the inability of central server 140 to identify an accurate stored model ID.

Hardware processor 502 may execute instruction 512 to update the ML model. For example, a classification for the network tuple parameter may be generated as output from a first ML model. The classification and previous input provided to the ML model may again be provided as input to a second ML model. This may help implement decentralized learning capability when a first ML model is implemented at network device 120 and the second ML model is implemented at central server 140.

Figure 6:
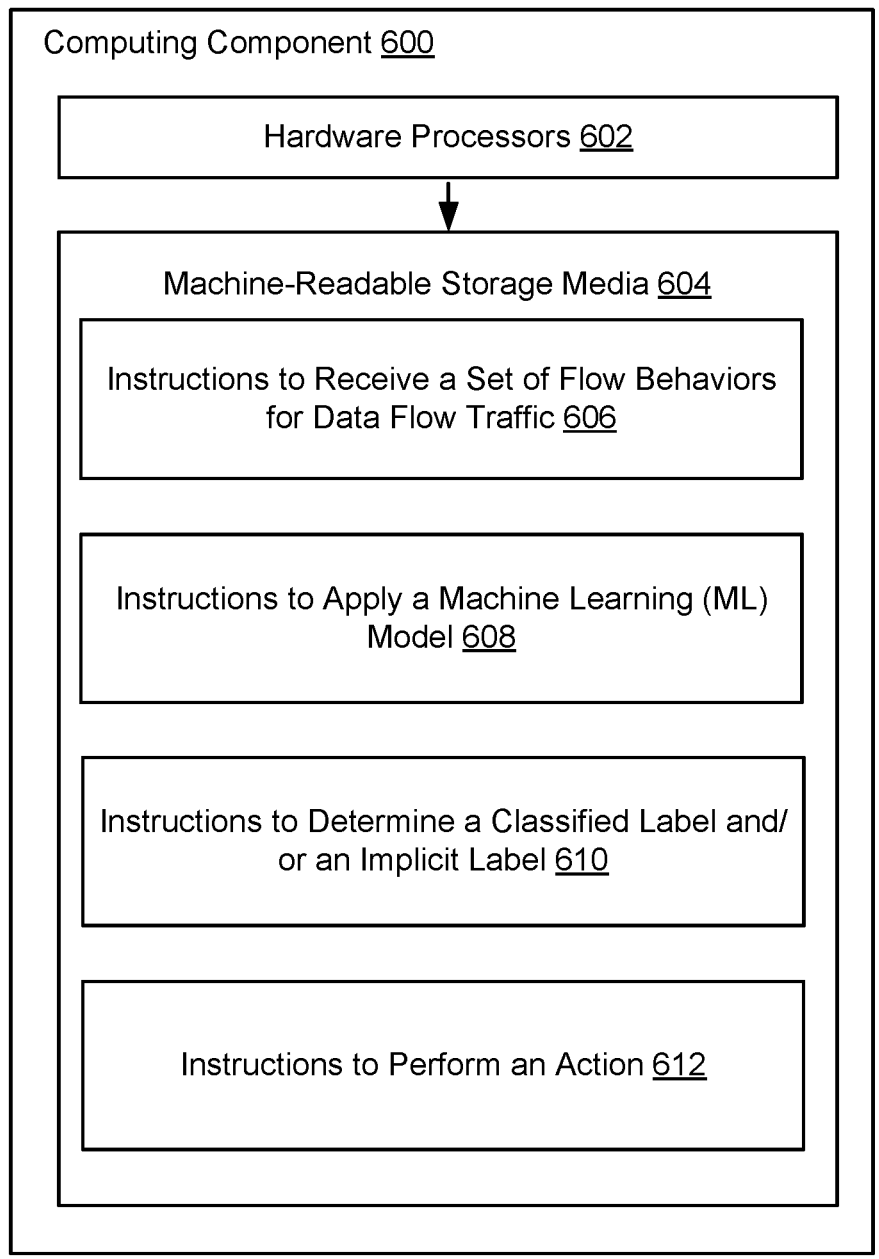
FIG. 6 is an example computing component that may be used to implement various features of examples described in the present disclosure.

FIG. 6 illustrates an example computing component that may be used to implement privacy preserving decentralized learning and network event monitoring in accordance with various examples. Computing component 600 may be, for example, network device 120 illustrated in FIG. 1 and FIG. 2. In the example implementation of FIG. 6, the computing component 600 includes a hardware processor 602, and machine readable storage medium for 604.

Hardware processor 602 may be one or more central processing units (CPUs), semiconductor-based microprocessors, and/or other hardware devices suitable for retrieval and execution of instructions stored in machine readable storage medium 604. Hardware processor 602 may fetch, decode, and execute instructions, such as instructions 606-612, to control processes or operations. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine readable storage medium, such as machine readable storage medium 604, may be any electronic, magnetic, optical, or other physical storage device that contains or stores executable instructions. Thus, machine readable storage medium 604 may be, for example, Random Access Memory (RAM), non-volatile RAM (NVRAM), an Electrically Erasable Programmable Read-Only Memory (EEPROM), a storage device, an optical disc, and the like. In some examples, machine readable storage medium 604 may be a non-transitory storage medium, where the term "non-transitory" does not encompass transitory propagating signals. As described in detail below, machine readable storage medium 604 may be encoded with executable instructions, for example, instructions 606-612.

Hardware processor 602 may execute instruction 606 to receive a set of flow behaviors for data flow traffic. For example, network device 120 may receive a set of flow behaviors for data flow traffic.

Hardware processor 602 may execute instruction 608 to apply a machine learning (ML) model. For example, network device 120 may apply the ML model that comprises labelled network tuples and signatures for flow behaviors to the set of flow behaviors. The output from the ML model may predict a network tuple parameter for a particular data flow of the data flow traffic.

Hardware processor 602 may execute instruction 610 to determine a classified label and/or an implicit label. For example, network device 120 may determine a classified label for the network tuple parameter for the particular data flow or determine an implicit label for a network tuple parameter for the particular data flow. The implicit label may comprise a reported value for the network tuple parameter.

In some examples, the classified label for the network tuple parameter may be compared to the implicit label.

Hardware processor 602 may execute instruction 612 to perform an action. The action may include generating or sending an alert, storing the labeled data flow in a database, initiating an automated process to change network settings, or automatically adjust the data flow from a different network device. For example, network device 120 may generate an alert associated with the comparison. The alert may identify a new behavior. For example, the new behavior can include changes to inter-packet arrival time (e.g., minimum, mean, maximum, standard deviation) or packet length (e.g. minimum, mean, maximum, etc.) for a particular data flow.

Figure 7:
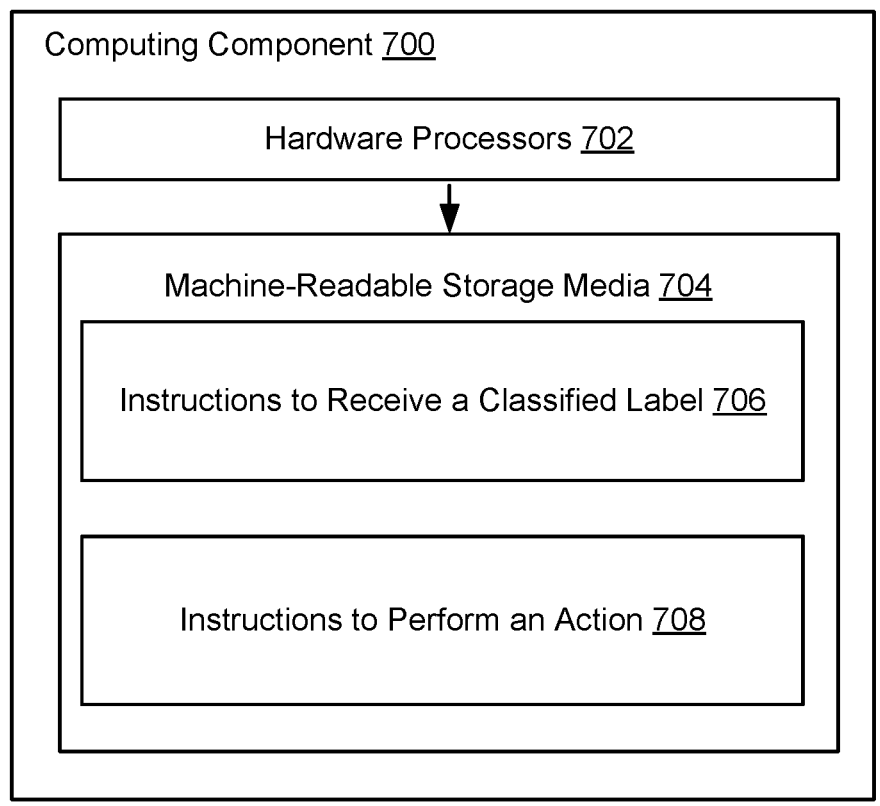
FIG. 7 is an example computing component that may be used to implement various features of examples described in the present disclosure.

FIG. 7 illustrates an example computing component that may be used to implement privacy preserving decentralized learning and network event monitoring in accordance with various examples. Computing component 600 may be, for example, central server 140 illustrated in FIG. 1 and FIG. 3. In the example implementation of FIG. 7, the computing component 700 includes a hardware processor 702, and machine readable storage medium for 704.

Hardware processor 702 may be one or more central processing units (CPUs), semiconductor-based microprocessors, and/or other hardware devices suitable for retrieval and execution of instructions stored in machine readable storage medium 704. Hardware processor 702 may fetch, decode, and execute instructions, such as instructions 706-708, to control processes or operations. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine readable storage medium, such as machine readable storage medium 704, may be any electronic, magnetic, optical, or other physical storage device that contains or stores executable instructions. Thus, machine readable storage medium 704 may be, for example, Random Access Memory (RAM), non-volatile RAM (NVRAM), an Electrically Erasable Programmable Read-Only Memory (EEPROM), a storage device, an optical disc, and the like. In some examples, machine readable storage medium 704 may be a non-transitory storage medium, where the term "non-transitory" does not encompass transitory propagating signals. As described in detail below, machine readable storage medium 704 may be encoded with executable instructions, for example, instructions 706-708.

Hardware processor 702 may execute instruction 706 to receive a classified label. For example, central server 140 may receive a classified label for a network tuple parameter from a network device, including network device 120. The classified label may be generated by, for example, monitoring flow behaviors at a network device; applying a machine learning (ML) model that comprises labelled network tuples and signatures for flow behaviors to the monitored flow behaviors to classify the flow behaviors and generate a network tuple parameter; and correlating the network tuple parameter to the classified label, wherein the classified label is received if a comparison of the classified label for the network tuple parameter was determined to differ from an implicit label, and wherein the implicit label corresponds with a network tuple parameter as reported in a packet header of a corresponding data flow.

Hardware processor 702 may execute instruction 708 to perform an action. The action may include generating or sending an alert, storing the labeled data flow in a database, initiating an automated process to change network settings, or automatically adjusting the data flow from a different network device. In some examples, central server 140 may generate an alert may be based on the classified label, where the alert identifies a new behavior.

Figure 8:
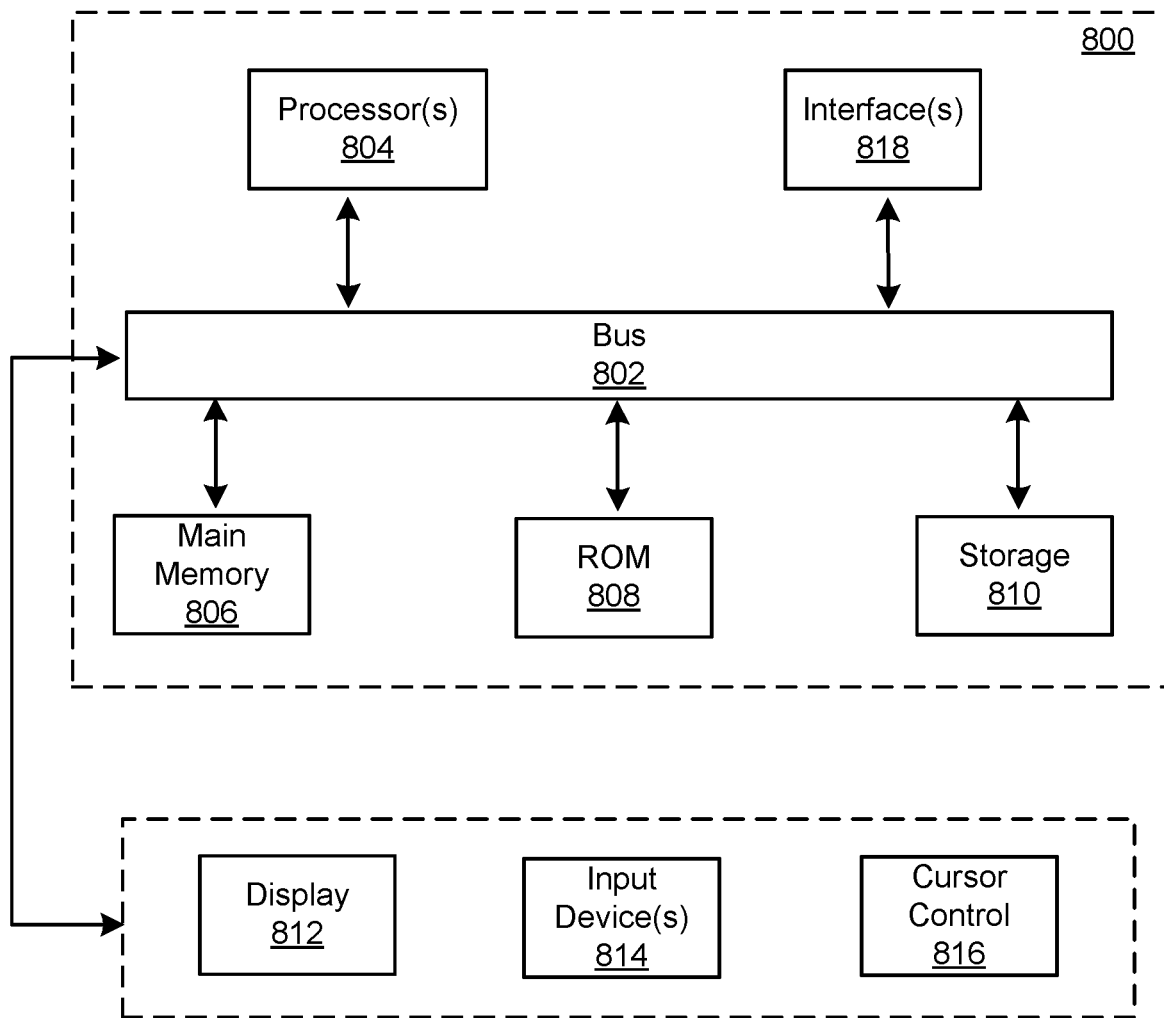
FIG. 8 depicts a block diagram of an example computer system in which various of the examples described herein may be implemented.

FIG. 8 depicts a block diagram of an example computer system 800 in which various of the examples described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some examples, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
    receiving, at a network device, a set of flow behaviors for data flow traffic;
    applying, at the network device, a machine learning (ML) model that comprises labelled network tuples and signatures for flow behaviors to the set of flow behaviors, wherein output from the machine learning model predicts a classified label for a particular data flow of the data flow traffic;
    determining, at the network device, an implicit label for a network tuple parameter for the particular data flow, wherein the implicit label comprises a reported value in a packet header of the particular data flow;
    comparing the classified label for the network tuple parameter to the implicit label; and
    perform an action associated with the comparison.

2. The method of claim 1, further comprising:
    when the comparison results in a mismatch, incrementing a counter for the data flow traffic.

3. The method of claim 2, further comprising:
    when the counter is above a threshold value, updating an alert to include a suspicious activity for the data flow traffic; and
    transmitting the alert to a central server.

4. The method of claim 1, further comprising:
    when the comparison results in a mismatch of the classified label and the implicit label, storing locally values for the flow behaviors and the implicit label.

5. The method of claim 1, wherein the flow behaviors depend on a model identifier (ID), and the method further comprising:
    storing values for the flow behaviors locally at the network device, absent transmitting the values to a central server.

6. The method of claim 1, further comprising:
    receiving, from a central server, a model identifier (ID) corresponding to a second machine learning (ML) model in a private set of ML models, each machine learning model comprising sets of public model IDs, labelled network tuples, and private flow signatures; and
    applying the set of flow behaviors to the second ML model corresponding to the model ID to predict the classified label for the network tuple parameter for the particular data flow, wherein the flow behaviors depend on the model ID.

7. The method of claim 6, wherein the second ML model is a random model from the private set of ML models.

8. The method of claim 6, further comprising:
    when the comparison results in a mismatch, sending to the central server the model ID and the classification.

9. The method of claim 6, further comprising:
    when the comparison results in a mismatch, storing the model ID and flow behavior signature locally at the network device.

10. The method of claim 6, further comprising:
    receiving an update of the private set of ML models, wherein the update is based on the classification for the network tuple parameter for the particular data flow.

11. The method of claim 1, wherein the set of flow behaviors include at least one of inter-packet arrival time or packet length for the particular data flow.

12. The method of claim 1, wherein the network tuple parameters comprises at least one of quality of service (QOS), virtual local area network (VLAN), or media access control (MAC) address.

13. The method of claim 1, wherein performing the action associated with the comparison identifies a new behavior at the network device, and wherein the new behavior is a cyber security risk relating to domain name system (DNS) issue.

14. A method comprising:
    receiving, at a central server, a classified label for a network tuple parameter, wherein the classified label was generated by:
        monitoring flow behaviors at a network device;

applying a machine learning (ML) model that comprises labelled network tuples and signatures for flow behaviors to the monitored flow behaviors to classify the flow behaviors and generate a classified label; and wherein the classified label is received if a comparison of the classified label for the network tuple parameter was determined to differ from an implicit label reported in a packet header of a corresponding data flow, and wherein the implicit label corresponds with the network tuple parameter; and perform an action based on the classified label.

15. The method of claim 14, further comprising:
generating, at the central server, a private set of ML models, the private set of ML models comprising sets of model identifiers (IDs), the labelled network tuples, and the signatures for flow behaviors.

16. The method of claim 15, wherein the signatures for flow behaviors are private to the central server.

17. The method of claim 15, further comprising:
determining a model ID from the sets of model IDs that correspond with the classified label;
transmitting the model ID to the network device; and
updating the private set of ML models based on the classified label for the network tuple parameter, the classified label for the network tuple parameter being generated by an application of a ML model having the corresponding model ID.

18. The method of claim 14, wherein performing the action associated with the comparison identifies a new behavior at the network device, and wherein the new behavior is a cyber security risk relating to domain name system (DNS) issue.

19. A non-transitory machine readable storage medium storing a plurality of instructions executable by one or more processors, the plurality of instructions when executed by the one or more processors cause the one or more processors to:
receive a set of flow behaviors for data flow traffic;
apply a machine learning (ML) model that comprises labelled network tuples and signatures for flow behaviors to the set of flow behaviors, wherein output from the machine learning model predicts a classified label for a particular data flow of the data flow traffic;
determine an implicit label for a network tuple parameter for the particular data flow, wherein the implicit label comprises a reported value in a packet header of the particular data flow;
compare the classified label for the network tuple parameter to the implicit label; and
perform an action associated with the comparison.

20. The non-transitory machine readable storage medium of claim 19, wherein the one or more processors further to:
receive, from a central server, a model identifier (ID) corresponding to a second machine learning (ML) model in a private set of ML models, each machine learning model comprising sets of public model IDs, labelled network tuples, and private flow signatures; and
apply the set of flow behaviors to the second ML model corresponding to the model ID to predict the classified label for the network tuple parameter for the particular data flow, wherein the flow behaviors depend on the model ID.

* * * * *